(12) United States Patent
Mazzola

(10) Patent No.: US 10,312,714 B2
(45) Date of Patent: Jun. 4, 2019

(54) METHOD FOR CONTROLLING A BATTERY CHARGER HAVING A DC-DC SERIES RESONANT CONVERTER

(71) Applicant: RENAULT s.a.s., Boulogne Billancourt (FR)

(72) Inventor: Walter Mazzola, Herbeville (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 203 days.

(21) Appl. No.: 15/509,886

(22) PCT Filed: Sep. 10, 2015

(86) PCT No.: PCT/FR2015/052409
§ 371 (c)(1),
(2) Date: Mar. 9, 2017

(87) PCT Pub. No.: WO2016/038304
PCT Pub. Date: Mar. 17, 2016

(65) Prior Publication Data
US 2017/0310143 A1    Oct. 26, 2017

(30) Foreign Application Priority Data
Sep. 11, 2014 (FR) .................................... 14 58535

(51) Int. Cl.
*H02M 1/00* (2006.01)
*H02J 7/02* (2016.01)
(Continued)

(52) U.S. Cl.
CPC .............. *H02J 7/022* (2013.01); *H02J 7/045* (2013.01); *H02M 1/08* (2013.01); *H02M 1/38* (2013.01);
(Continued)

(58) Field of Classification Search
CPC ...................................................... H02J 7/022
(Continued)

(56) References Cited

U.S. PATENT DOCUMENTS 4,864,483 A * 9/1989 Divan ................. H02M 5/4585
363/37
7,333,348 B2 * 2/2008 Horiuchi ........... H02M 3/33523
363/132

(Continued)

FOREIGN PATENT DOCUMENTS

FR    3001091 A1    7/2014

OTHER PUBLICATIONS

International Search Report dated Nov. 26, 2015, in PCT/FR2015/052409, filed Sep. 10, 2015.
(Continued)

*Primary Examiner* — Richard V Muralidar
(74) *Attorney, Agent, or Firm* — Oblon, McClelland, Maier & Neustadt, L.L.P.

(57) ABSTRACT

A method controls a battery charger that includes a direct-current-to-direct-current series resonant converter. The converter includes a full bridge. The method includes controlling the opening of an upper transistor of the bridge, controlling the closing of the lower transistor of the same arm following an idle time after the opening of the upper transistor, after analysis of the change in the voltage across the terminals of the lower transistor during the idle time.

9 Claims, 4 Drawing Sheets

(51) Int. Cl.
  *H02M 1/38*   (2007.01)
  *H02M 3/335*  (2006.01)
  *H02M 3/337*  (2006.01)
  *H02J 7/04*   (2006.01)
  *H02M 1/08*   (2006.01)
  *H02M 1/42*   (2007.01)

(52) U.S. Cl.
  CPC ......... *H02M 1/4208* (2013.01); *H02M 3/335* (2013.01); *H02M 3/337* (2013.01); *H02M 3/33507* (2013.01); *H02M 2001/0058* (2013.01); *Y02B 70/1433* (2013.01); *Y02B 70/1491* (2013.01)

(58) Field of Classification Search
  USPC .............................. 320/140; 363/17; 323/235
  See application file for complete search history.

(56) References Cited

U.S. PATENT DOCUMENTS

| | | | | |
|---|---|---|---|---|
| 8,553,430 | B2* | 10/2013 | Melanson | H01F 3/10 363/21.03 |
| 9,653,996 | B2* | 5/2017 | Parto | H02M 3/158 |
| 2002/0054498 | A1 | 5/2002 | Cho et al. | |
| 2014/0103863 | A1* | 4/2014 | Fassnacht | H02M 1/4225 320/107 |

OTHER PUBLICATIONS

French Search Report dated May 5, 2015, in French Patent Application No. 1458535, filed Sep. 11, 2014.
Khaligh, et al., "Comprehensive Topological Analysis of Conductive and Inductve Charging Solutions for Plug-In Electric Vehicles", IEEE Transactions on Vehicular Technology, vol. 61, No. 8, Oct. 2012, p. 3475-3489, XP011481314.

* cited by examiner

METHOD FOR CONTROLLING A BATTERY CHARGER HAVING A DC-DC SERIES RESONANT CONVERTER

BACKGROUND

The present invention generally relates to the electrotechnical field and relates, more precisely, to a method for controlling a battery charger, usable notably in an electric vehicle for controlling the charging of a drive power battery of such a vehicle.

In order to make durable mobility accessible to all, it is necessary to develop electric vehicles that are low cost and rechargeable over the home electrical power network. Such vehicles preferably have a drive power battery charger operating at low power, notably limited to 7 kW when it is connected to a single-phase AC power network.

Amongst the possible charger architectures may be differentiated, on the one hand, the chargers using a transformer with a galvanic isolation between the external electrical supply network and the vehicle to be charged, referred to as isolated chargers, and, on the other hand, the chargers not isolated from the external electrical power network. Isolated chargers are preferred for the simplicity of the management of the electrical safety during the charging of an electric vehicle incorporating such an isolated charger, despite the slightly higher cost and additional volume to be provided owing to the integration into the charger of a galvanic isolation transformer.

The French patent application FR3001091 describes an isolated charger for electric vehicles designed for a slow charging process at 7 kW over a single-phase external electrical power network. This isolated charger comprises an input rectifier stage connected, at its output, to a DC-DC converter stage, itself connected at its output to the drive power battery via a voltage step-up stage.

The DC-DC converter stage itself comprises:
- an inverter whose input is connected to the input rectifier stage and whose output is connected to a resonant circuit,
- the resonant circuit connected to the inverter,
- a galvanic isolation transformer integrated into the resonant circuit which comprises in series the primary winding of the transformer, a resonance capacitor and a resonance inductor,
- a rectifier whose input is connected to the secondary winding of the transformer and, at its output, to the step-up stage which is connected to the drive power battery of the vehicle.

In order to limit the losses during the transfer of energy from the supply network to the battery, the components of the resonant circuit are chosen in such a manner that the transfer of energy within the transformer can take place at the frequency of resonance of the resonant circuit. The inverter is then controlled so as to produce an AC current at the resonance frequency. For this purpose and in order to reduce the switching losses, the transistors of the inverter are therefore switched at high frequency in such a manner that their switching is carried out at zero voltage (switching known as ZVS for "Zero Voltage Switching") and at zero current (switching known as ZCS for "Current Voltage Switching"), at the resonance frequency.

This type of isolated charger requires a precise matching of the components of the isolated charger, and notably of the resonant circuit, in order to obtain an adequate performance and so as not to cause oscillations which would cause the destruction of the transistors by charge overlap in the junctions.

BRIEF SUMMARY

One of the aims of the invention is to overcome at least a part of the drawbacks of the prior art by supplying a method for controlling an isolated battery charger, together with a control system for such a charger, which allow the robustness of the isolated charger to be improved with respect to a relatively large variation in the characteristics of the components of this charger, within a margin of tolerance of +/−20%, while at the same time being simple to implement.

For this purpose, the invention provides a method for controlling a battery charger comprising a series resonance DC-DC converter connected at its input to an input rectifier stage connected to an AC power supply network, and connected at its output to a battery, said converter comprising:
- a full bridge composed of at least two transistor arms, each of said arms comprising a top transistor and a bottom transistor, the collectors of the top transistors being connected to the positive output bus of the input rectifier stage and the emitters of the top transistors being connected to the respective ends of a series resonant circuit comprising a capacitor, an inductor and a primary winding of a transformer, the collector of each bottom transistor being connected to the emitter of the top transistor in the same arm as said bottom transistor, and the emitter of each bottom transistor being connected to the negative output bus of the input rectifier stage,
- said series resonant circuit,
- said transformer whose primary winding is connected to the full bridge and whose secondary winding is connected to the input of an output rectifier,
- circuits to aid the switching at zero voltage of said top and bottom transistors,
- and said output rectifier connected at its output to said battery said method comprising:
- a step for controlling the opening of one of said top transistors,
- a step for controlling the closing of one of said bottom transistors of the same arm as said one of said top transistors a dead time after said step for controlling the opening, characterized in that said step for controlling the closing is conditioned at a test step carried out on the time variation of an estimation of the voltage across the terminals of said one of said bottom transistors during said dead time.

By virtue of the invention, the turning on of a transistor of the DC-DC converter at a moment when the voltage across its terminals is maximum, owing to the presence of an unwanted voltage oscillation across the terminals of this transistor, is avoided. Indeed, the inventor has noted that the presence of the capacitors for assisting the ZVS and ZCS switching located in parallel with the transistors of the DC-DC converter provides, during the switching, a secondary resonance during the dead times between the opening of a transistor and the closing of another transistor in the same arm. This secondary resonance induces oscillations across the terminals of the transistors, with the result that the transistors are likely to be turned on at a time when the voltage across their terminals is maximum. The charger then no longer operates in ZVS mode which leads to the production of significant and undesirable electromagnetic emissions, but also the generation of large over-voltages across the terminals of the switches concerned, which are capable of destroying these switches.

According to one advantageous feature of the control method according to the invention, during said test step, the time variation of said voltage is analyzed, said step for controlling the closing only being triggered when said voltage is detected to be increasing.

This implementation of the invention allows the duration of the dead time between the opening and the closing of the switches to be limited, a fact which optimizes the efficiency of the isolated charger.

According to yet another advantageous feature of the control method according to the invention, said control step is only triggered when said voltage is furthermore in the range between a predetermined low voltage threshold and high voltage threshold.

This feature of the invention allows the minor voltage oscillations and the hysteresis phenomena to be filtered while at the same time maintaining a high efficiency for the isolated charger.

Advantageously, said high threshold is at least less than 5% of the maximum voltage across the terminals of said one of said bottom transistors in nominal operation of said DC-DC converter.

The invention also relates to a battery charging system comprising an input rectifier stage able to be connected to an AC power supply network, a series resonance DC-DC converter connected to the input of said input rectifier stage and able to be connected at its output to a battery, said converter comprising:
  a full bridge composed of at least two transistor arms, each of said arms comprising a top transistor and a bottom transistor, the collectors of the top transistors being connected to the positive output bus of the input rectifier stage and the emitters of the top transistors being connected to the respective ends of a series resonant circuit comprising a capacitor, an inductor and a primary winding of a transformer, the collector of each bottom transistor being connected to the emitter of the top transistor in the same arm as said bottom transistor, and the emitter of each bottom transistor being connected to the negative output bus of the input rectifier stage,
  said series resonant circuit,
  said transformer whose primary winding is connected to the full bridge and whose secondary winding is connected to the input of an output rectifier,
  circuits to aid the switching at zero voltage of said top and bottom transistors,
  and said output rectifier able to be connected at its output to said battery,
said system comprising:
  means for controlling the opening of each top transistor,
  means for controlling the closing of each bottom transistor a dead time after the opening of the top transistor in the same arm,
characterized in that it comprises means for triggering said closing control means, depending on the time variation of an estimation of the voltage across the terminals of the corresponding bottom transistor during said dead time.

Advantageously, said means for triggering the charging system according to the invention comprise means for detecting an increase of said voltage, said triggering means being activated by said detection means. In other words, said triggering means are designed to activate the closing of the bottom transistor only when said voltage is increasing.

Advantageously, said triggering means are activated by said detection means only when said voltage is in the range between a predetermined low and high voltage threshold. The high threshold is advantageously at least less than 5% of the maximum voltage across the terminals of the bottom transistor in nominal operation of the DC-DC converter.

The invention furthermore relates to a computer program comprising instructions for implementing the method for controlling a battery charger according to the invention, when it is executed on one or more processors.

The charging system according to the invention and a computer program according to the invention offer advantages analogous to those of the control method according to the invention.

BRIEF DESCRIPTION OF THE DRAWINGS

Other features and advantages will become apparent upon reading one preferred embodiment described with reference to the figures in which.

DETAILED DESCRIPTION

Figure 1:
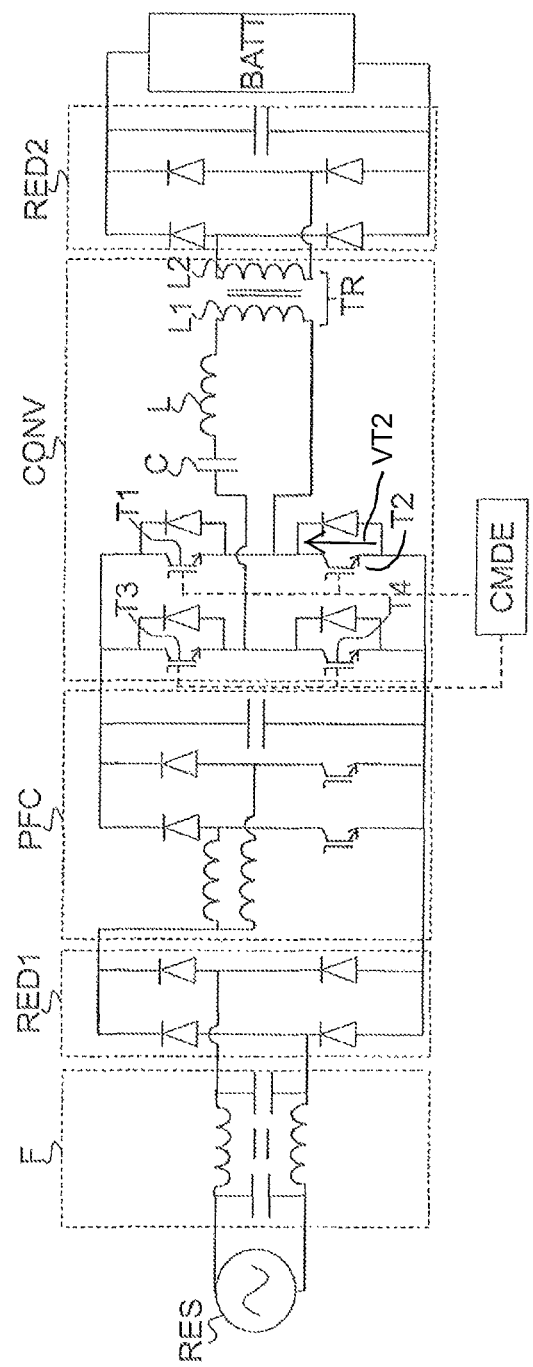
FIG. 1 shows a charging system according to the invention, in this preferred embodiment.

According to one preferred embodiment of the invention shown in FIG. 1, the charging system according to the invention comprises:
  an input rectifier stage able to be connected to a single-phase power supply network RES,
  a DC-DC converter CONV whose input is connected to the input rectifier stage,
  and an output rectifier RED2 connected at its input to the DC-DC converter CONV, and able to be connected at its output to a battery BATT, here a drive power battery for electric or hybrid vehicle with a nominal voltage of around 400V (volts).

The input rectifier stage comprises:
  an electromagnetic compatibility filter F that is connected to the single-phase network RES,
  a rectifier RED1, composed of a diode bridge, generating a DC voltage from the voltage delivered by the power supply network and filtered by the filter F,
  and a power factor correction stage PFC connected at its input to the rectifier RED1 and at its output to the input of the converter CONV; this stage PFC ensures the absorption of a sinusoidal current on the network RES and is composed of two voltage step-up arms connected in parallel to an output smoothing capacitor of the power factor correction stage PFC.

The DC-DC converter CONV comprises:
  a full bridge composed of two transistor arms, a first arm comprising a top transistor T3 and a bottom transistor T4, a second arm comprising a top transistor T1 and a bottom transistor T2; the collectors of the top transistors T3 and T1 are connected to the positive DC voltage bus at the output of the power factor correction stage PFC; the emitters of the bottom transistors T4 and T2 are connected to the negative output bus of the power factor correction stage PFC;

a series resonance circuit connected at a first end to the mid-point of the first arm, in other words to the point of connection between the emitter of the transistor T3 and the collector of the transistor T4, and, at a second end, to the mid-point of the second arm, in other words to the point of connection between the emitter of the transistor T1 and the collector of the transistor T2;

a transformer TR whose primary winding L1 is connected to the full bridge and whose secondary winding L2 is connected to the input of an output rectifier RED2;

and the output rectifier RED2 composed of a diode bridge and of an output smoothing capacitor, that is connected in parallel with the battery BATT. The mid-points of the two arms of the diode bridge are each connected to a different end of the secondary winding L2 of the transformer TR.

The series resonance circuit comprises, connected in series, a capacitor C, an inductor L and the primary winding L1 of the transformer TR.

In addition, free-wheeling diodes are connected in parallel with each transistor T1, T2, T3 and T4. The transistors T1, T2, T3 and T4 are also equipped with circuits to aid the ZVS and ZCS switching such as dipoles composed of capacitors connected in series with resistors referred to as "snubber resistors" in parallel with each transistor T1, T2, T3 and T4 (not shown).

The charging system according to the invention also comprises means CMDE integrated for example into an electronic board, for controlling the transistors T1 to T4.

Figure 2:
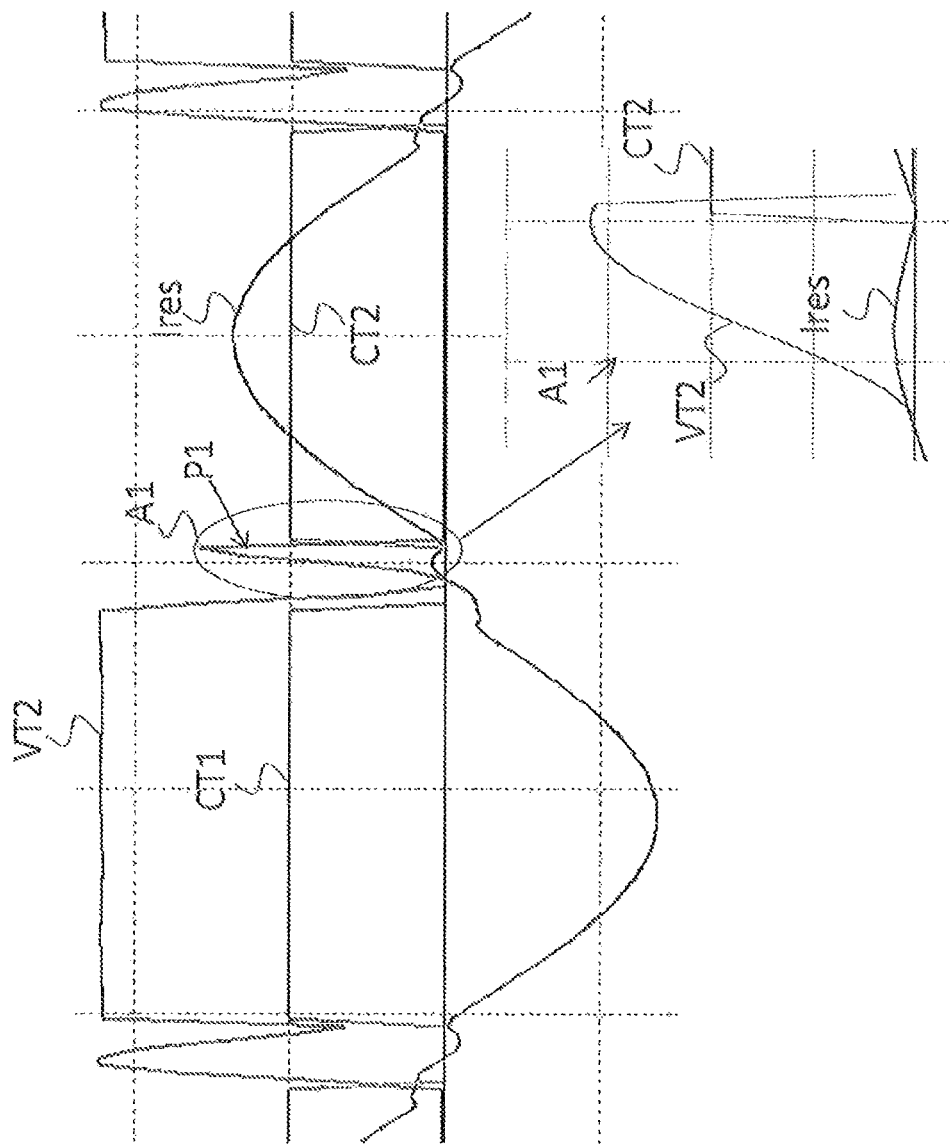
FIG. 2 shows the control of a charging system of the same topology but not implementing the invention.

With reference to FIG. 2, the current Ires flowing in the winding L of the DC-DC converter CONV, the control signal CT1 for the transistor T1, the control signal CT2 for the transistor T2, together with the voltage VT2 across the terminals of the transistor T2, are shown on the same time axis when the control method according to the invention is not implemented.

When the control signal CT1 is at its high value, the transistor T1 is closed and the transistor T2 is open. Across the terminals of the transistor T2, the voltage VT2 then forms a voltage pulse which decreases rapidly immediately after the opening of the transistor T1, when the control signal CT1 goes to its zero value. However, this decrease is followed by a secondary resonance peak P1 which can be more precisely seen on the enlargement A1 of a part of FIG. 2. It can be seen that the control signal CT2 of the transistor T2 controls the closing of the latter by going to its high value at a moment when the voltage VT2 is almost at the maximum of its of secondary resonance peak P1, which means that the charging system no longer operates in ZVS mode. Other resonance peaks can be seen in this FIG. 2, since they appear during the dead times between the switching of a transistor and that of the other transistor in the same arm.

Figure 3:
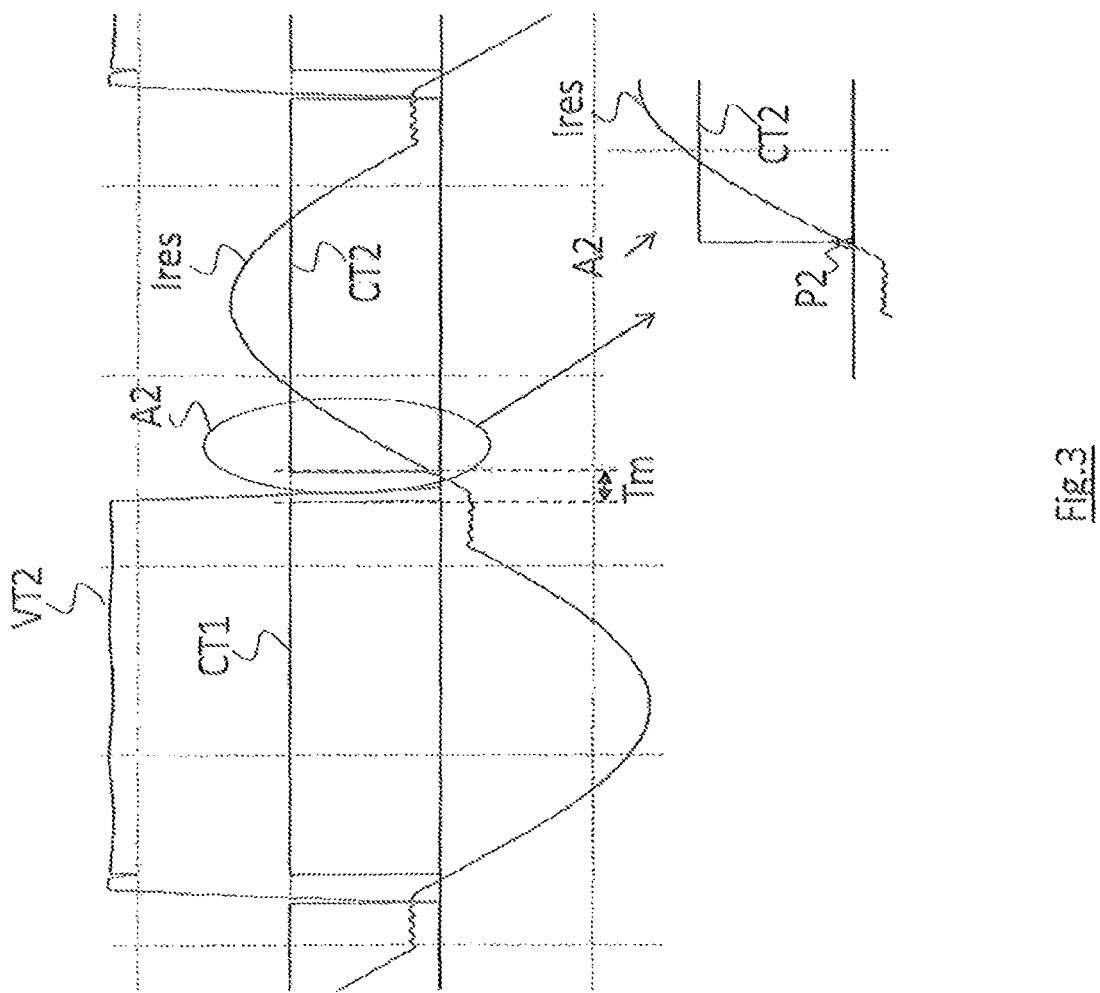
FIG. 3 shows the control of the charging system according to the invention, in this preferred embodiment.

With reference to FIG. 3, the current Ires flowing in the winding L of the DC-DC converter CONV, the control signal CT1 of the transistor T1, the control signal CT2 of the transistor T2, together with the voltage VT2 across the terminals of the transistor T2, are shown on the same time axis when the control method according to the invention is implemented.

In this FIG. 3, the voltage VT2 across the terminals of the transistor T2 decreases rapidly just after the opening of the transistor T1, during the dead time Tm between the opening of the transistor T1 and the closing of the transistor T2. The time variation of the voltage VT2 across the terminals of the transistor T2 is shown more precisely on the enlargement A2 of this part of FIG. 3. During the dead time Tm, the secondary resonance P2 of the voltage VT2 across the terminals of the transistor T2 is much weaker than the secondary resonance peak P1 in FIG. 2. Indeed, the closing of the transistor T2 is carried out at the start of the rise of the voltage VT2 during this secondary resonance P2. This switching strategy therefore inhibits the secondary resonance P2 since the value of the voltage VT2 goes to a zero value when the transistor T2 is closed, hence well before the secondary resonance reaches a resonance peak. The invention therefore allows the operation of the charging system in ZCS and ZVS mode despite the secondary resonance phenomena due to the switching assist circuits.

Figure 4:
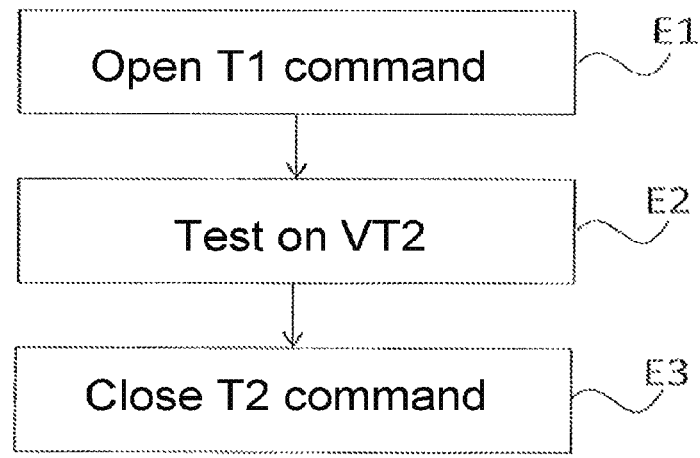
FIG. 4 shows steps of the control method according to the invention.

The control method according to the invention is now represented in the form of an algorithm comprising steps E1 to E3 shown in FIG. 4.

The method is implemented within the electronic control means CMDE.

Figure 5:
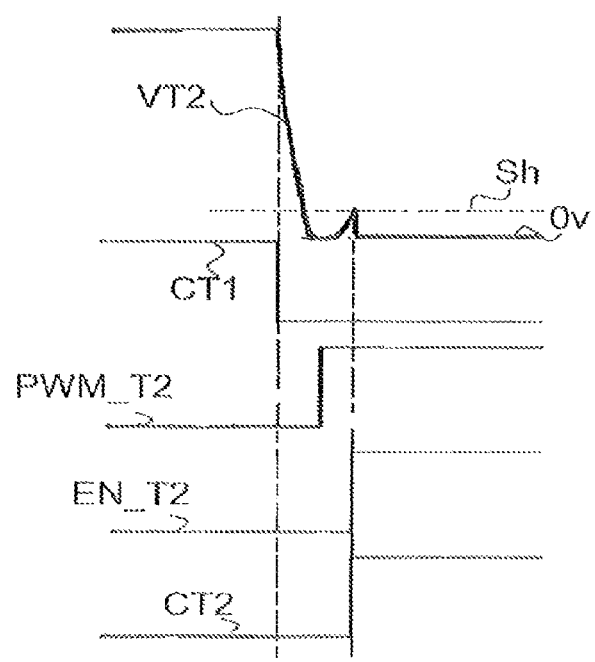
FIG. 5 shows control signals for the charging system according to the invention, in this preferred embodiment.

The step E1 is the command of the opening of a top transistor of the charging system according to the invention, in this example the transistor T1. This step corresponds to the setting to zero of the control signal CT1 of the transistor T1, shown in FIG. 5.

The next step E2 is a test step carried out on a measurement signal for the voltage VT2 across the terminals of the bottom transistor T2. In this step, the time variation of the voltage VT2 is supervised by calculating the difference between the voltage VT2 measured at a time t and the preceding measurement of the voltage VT2 at a preceding time t−1. When this difference is positive, it is furthermore verified that the voltage VT2 is in the range between a low threshold of 0V for example and a high threshold Sh much lower than the maximum value of the voltage VT2 during the nominal operation of the charging system according to the invention. This high threshold Sh is fixed for example at 5% of the maximum voltage across the terminals of the transistor T2 in nominal operation.

If these conditions are verified, in other words if the measurement signal for the voltage VT2 is in the range between the low threshold and the high threshold Sh, and if the derivative of this signal is positive, then a signal EN_T2 authorizing the closing of the transistor T2 is set to a high value.

When the signal EN_T2 is at its high value and when a control signal PWM_T2 for the transistor T2 is also at its high value, then the method goes to the next step E3. The control signal PWM-T2 ensures the existence of a minimum dead time between the switching of the switches in the same arm, and the generation of the control duty cycle of the transistor T2.

The next step E3 is the command of the closing of the transistor T2, corresponding to setting the control signal CT2 of the transistor T2 to its high value.

It should be noted that these steps are repeated in a symmetrical manner on the other arm of the bridge. At the opening of the transistor T3, the method waits for the voltage across the terminals of the transistor T4 to be increasing and in the range between the low threshold of 0 V and the high threshold Sh before authorizing the closing of the transistor T4.

It should be noted that, although in this embodiment the charging system uses a single-phase power supply network, the invention is also usable on a charging system using a series resonance DC-DC converter operating in ZVS and ZCS mode but using a three-phase power supply network. Indeed, in such a variant embodiment, it suffices to use a rectifier bridge with three arms in the input rectifier stage, rather than using a rectifier bridge with two arms. Similarly, the invention may also be implemented on topologies slightly different from that described in this embodiment. Indeed, the power factor correction stage or the electromagnetic compatibility filter at the input of the charging system are not necessary for the implementation and for the operation of the invention, although their presence is preferable in order to comply with network connection standards. Similarly, the smoothing capacitors of the charging system are not essential to the implementation of the invention.

The invention claimed is:

1. A method for controlling a battery charger comprising a series resonance DC-DC converter connected at an input to an input rectifier stage connected to an AC power supply network, and connected at an output to a battery, said converter comprising:
a full bridge composed of at least two transistor arms, each of said arms comprising a top transistor and a bottom transistor, collectors of the top transistors being connected to a positive output bus of the input rectifier stage and emitters of the top transistors being connected to respective ends of a series resonant circuit comprising a capacitor, an inductor and a primary winding of a transformer, a collector of each bottom transistor being connected to the emitter of the top transistor in a same arm as said bottom transistor, and an emitter of each bottom transistor being connected to a negative output bus of the input rectifier stage,
said series resonant circuit,
said transformer whose primary winding is connected to the full bridge and whose secondary winding is connected to an input of an output rectifier,
circuits to aid switching at zero voltage of said top transistors and said bottom transistors, and
said output rectifier connected at an output to said battery, said method comprising:
controlling an opening of one of said top transistors; and
controlling a closing of one of said bottom transistors in the same arm as said one of said top transistors at a dead time after said controlling the opening,
wherein the controlling the closing is conditioned to a test step carried out on a time variation of an estimation of a voltage across the terminals of said one of said bottom transistors during said dead time.

2. The control method as claimed in claim 1, wherein, during said test step, the time variation of said voltage is analyzed, said controlling the closing only being triggered when said voltage is detected to be increasing.

3. The control method as claimed in claim 2, wherein said controlling the closing is only triggered when said voltage is furthermore in a range between a predetermined low voltage threshold and high voltage threshold.

4. The control method as claimed in claim 3, wherein said high threshold is at least less than 5% of a maximum voltage across the terminals of said one of said bottom transistors in nominal operation of said DC-DC converter.

5. A non-transitory computer readable medium storing a program that, when executed by a computer, causes the computer to execute the method for controlling a battery charger as claimed in claim 1.

6. A battery charging system, comprising:
an input rectifier stage able to be connected to an AC power supply network;
a series resonance DC-DC converter connected to an input of said input rectifier stage and able to be connected at an output to a battery, said converter comprising:
a full bridge including at least two transistor arms, each of said arms comprising a top transistor and a bottom transistor, a collectors of the top transistors being connected to a positive output bus of the input rectifier stage and emitters of the top transistors being connected to respective ends of a series resonant circuit comprising a capacitor, an inductor, and a primary winding of a transformer, a collector of each bottom transistor being connected to the emitter of the top transistor in a same arm as said bottom transistor, and an emitter of each bottom transistor being connected to a negative output bus of the input rectifier stage,
said series resonant circuit,
said transformer whose primary winding is connected to the full bridge and whose secondary winding is connected to an input of an output rectifier,
circuits to aid switching at zero voltage of said top transistors and said bottom transistors, and
said output rectifier able to be connected at an output to said battery;
means for controlling an opening of each top transistor;
means for controlling closing of each bottom transistor at a dead time after the opening of the top transistor in the same arm; and
means for triggering said means for controlling closing, depending on a time variation of an estimation of a voltage across terminals of the corresponding bottom transistor during said dead time.

7. The charging system as claimed in claim 6, wherein said means for triggering comprise means for detecting an increase of said voltage, said means for triggering being activated by said means for detecting.

8. The charging system as claimed in claim 7, wherein said means for triggering are activated by said means for detecting only when said voltage is in a range between a predetermined low voltage threshold and high voltage threshold.

9. The charging system as claimed in claim 8, wherein said high threshold is at least less than 5% of a maximum voltage across the terminals of said bottom transistor in nominal operation of said DC-DC converter.

* * * * *